United States Patent
Washio

(10) Patent No.: US 10,753,463 B2
(45) Date of Patent: Aug. 25, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 16/233,652

(22) Filed: Dec. 27, 2018

(65) Prior Publication Data

US 2019/0195360 A1 Jun. 27, 2019

(30) Foreign Application Priority Data

Dec. 27, 2017 (JP) ................................. 2017-252417

(51) Int. Cl.
| | |
|---|---|
| *B60W 30/18* | (2012.01) |
| *F16H 61/02* | (2006.01) |
| *F16H 59/50* | (2006.01) |
| *F16H 61/66* | (2006.01) |
| *F16H 37/02* | (2006.01) |

(Continued)

(52) U.S. Cl.
CPC ... *F16H 61/0213* (2013.01); *B60W 30/18172* (2013.01); *B60W 10/107* (2013.01); *B60W 2520/26* (2013.01); *B60W 2710/1005* (2013.01); *F16H 37/022* (2013.01); *F16H 61/662* (2013.01); *F16H 2059/506* (2013.01); *F16H 2061/0239* (2013.01); *F16H 2061/6601* (2013.01)

(58) Field of Classification Search
CPC ....... B60W 30/18172; B60W 2520/26; B60W 2710/1005; F16H 2059/506; F16H 2061/0239
See application file for complete search history.

(56) References Cited

U.S. PATENT DOCUMENTS 9,540,012 B2 * 1/2017 Matsuo ................ B60W 10/02
10,571,021 B2 * 2/2020 Aoyama ............ B60K 17/3515
(Continued)

FOREIGN PATENT DOCUMENTS

| WO | 2014/170960 A1 | 10/2014 |
|---|---|---|
| WO | 2015/141547 A1 | 9/2015 |

*Primary Examiner* — David R Morris
(74) *Attorney, Agent, or Firm* — Oliff PLC

(57) ABSTRACT

A control apparatus for a vehicle drive-force transmitting apparatus including a gear mechanism and a continuously-variable transmission mechanism provided in respective first and second drive-force transmitting paths. The control apparatus sets a target gear ratio of the continuously-variable transmission mechanism during a switching control operation that is executed to switch between (i) a first state in which the first drive-force transmitting path is established and (ii) a second state in which the second drive-force transmitting path is established, such that, when drive wheels are not being slipped, the target gear ratio is set to a highest gear ratio of the continuously-variable transmission mechanism, and such that, when the drive wheels are being slipped, the target gear ratio is set to an actual gear ratio at a point of time at which the drive wheels start being slipped.

9 Claims, 2 Drawing Sheets

(51) Int. Cl.
*B60W 10/107* (2012.01)
*F16H 61/662* (2006.01)

(56) References Cited

U.S. PATENT DOCUMENTS

2016/0121896 A1    5/2016  Matsuo et al.
2019/0145515 A1*  5/2019  Aoyama .................. F16H 9/18
                                                            192/3.63

* cited by examiner

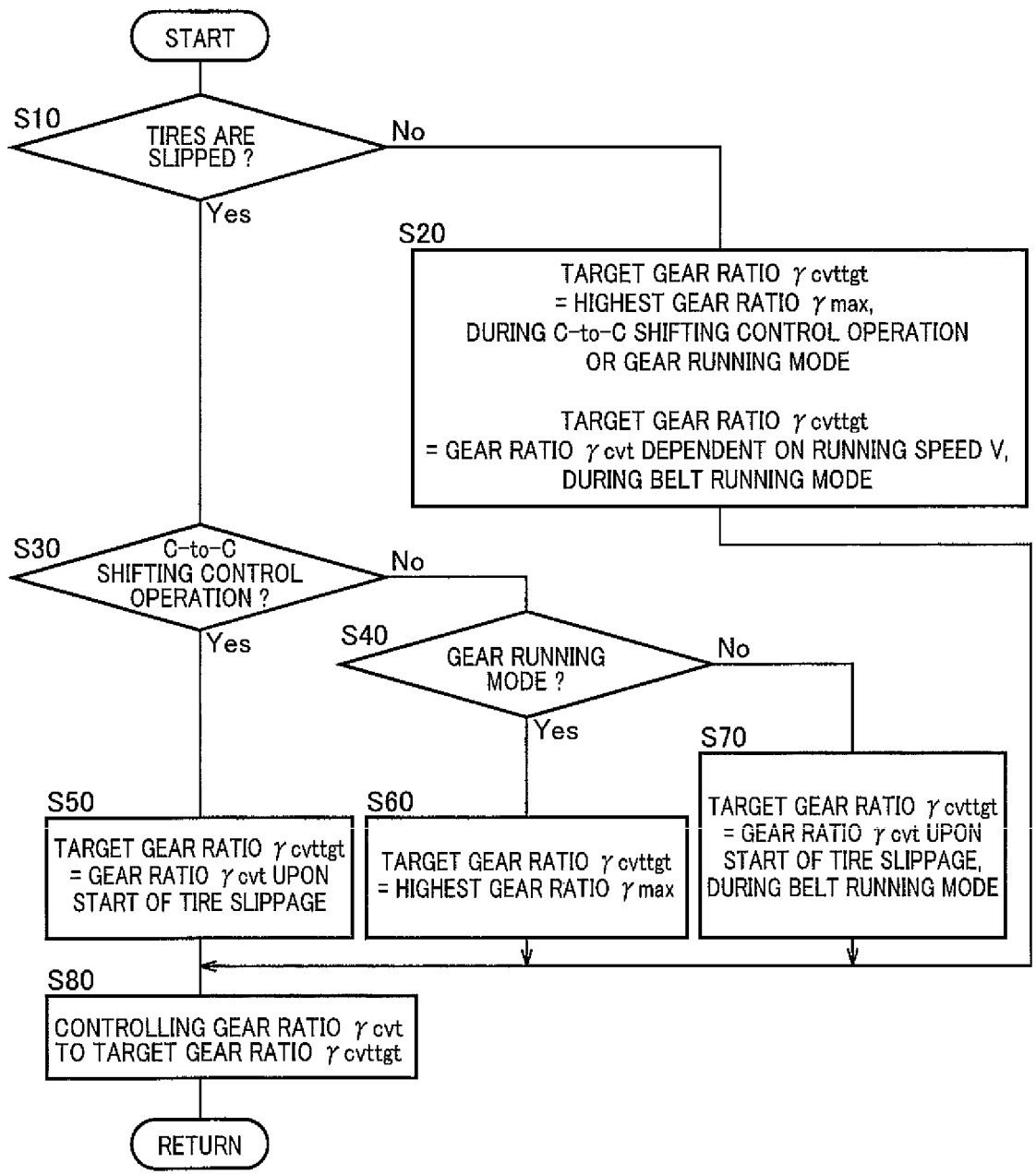

CONTROL APPARATUS FOR VEHICLE DRIVE-FORCE TRANSMITTING APPARATUS

This application claims priority from Japanese Patent Application No. 2017-252417 filed on Dec. 27, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus includes: an input rotary member to which a drive force is to be transmitted from the drive force source; an output rotary member from which the drive force is to be outputted to the drive wheels; a gear mechanism configured to provide at least one gear ratio; and a continuously-variable transmission mechanism including a primary pulley, a secondary pulley and a transfer element looped over the primary and secondary pulleys. The drive-force transmitting apparatus defines a plurality of drive-force transmitting paths that are provided in parallel with each other between the input rotary member and the output rotary member. The plurality of drive-force transmitting paths include a first drive-force transmitting path through which the drive force is to be transmitted by the gear mechanism and a second drive-force transmitting path through which the drive force is to be transmitted by the continuously-variable transmission mechanism. WO2014/170960 discloses such a control apparatus for a vehicle having the drive-force transmitting apparatus in which the gear mechanism and a continuously-variable transmission mechanism are provided to be parallel with each other, teaching that the continuously-variable transmission mechanism provides a continuously-variable gear ratio that is lower than a gear ratio provided by the gear mechanism and that the control apparatus executes a switching control operation and a shifting control operation concurrently with each other, wherein the switching control operation is an operation for switching an operation state of the drive-force transmitting apparatus from a first state in which the first drive-force transmitting path is established to a second state in which the second drive-force transmitting path is established, while the shifting control operation is an operation for changing the gear ratio of the continuously-variable transmission mechanism. It is noted that the term "gear ratio" is defined as "rotational speed of input-side rotary member/rotational speed of output-side rotary member". For example, the gear ratio of the drive-force transmitting apparatus is defined as "rotational speed of the input rotary member/rotational speed of the output rotary member", and the gear ratio of the continuously-variable transmission is defined as "rotational speed of the primary pulley/rotational speed of the secondary pulley". It is also noted that the above-described expression that the continuously-variable gear ratio of the continuously-variable transmission mechanism is lower than the gear ratio provided by the gear mechanism, is interpreted to mean that the continuously-variable gear ratio of the continuously-variable transmission mechanism makes a vehicle running speed higher than the gear ratio of the gear mechanism, and that the highest gear ratio value of the continuously-variable gear ratio of the continuously-variable transmission mechanism can be expressed also as a lowest-speed gear ratio.

SUMMARY OF THE INVENTION

By the way, there is a case in which an excessively large torque is inputted to the drive-force transmitting apparatus from the drive wheels, for example, upon sudden reduction of rotational speed of the drive wheels when the vehicle has passed through a low friction-efficient road on which the drive wheels had been slipped, wherein the sudden reduction of the rotational speed of the drive wheels is caused by grip of the drive wheels with a surface of the road. Where the drive-force transmitting apparatus is provided with the continuously-variable transmission mechanism in which the transfer element is looped over the pulleys, the transfer element could be slipped on the pulleys by the excessively large torque inputted to the drive-force transmitting apparatus. Particularly, when the switching control operation for switching between the first state (in which the first drive-force transmitting path is established) and the second state (in which the second drive-force transmitting path is established) is executed together with the shifting control operation for performing a shift-down action to change the gear ratio of the continuously-variable transmission mechanism to the highest gear ratio as the target gear ratio, if the above-described excessively large torque is inputted to the drive-force transmitting apparatus, the slippage of the transfer element could be caused due to the excessively large torque transmitted to the continuously-variable transmission mechanism provided in the second drive-force transmitting path and a reduction of a thrust which is applied to the primary pulley and which serves as a clamping force to clamp the transfer element.

The present invention was made in view of the background art described above. It is therefore an object of the present invention to provide a control apparatus for a vehicle drive-force transmitting apparatus, which is capable of restraining or preventing a slippage of the transfer element when the drive wheels are slipped.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: (i) an input rotary member to which a drive force is to be transmitted from the drive force source; (ii) an output rotary member from which the drive force is to be outputted to the drive wheels; (iii) a gear mechanism configured to provide at least one gear ratio; and (iv) a continuously-variable transmission mechanism including a primary pulley, a secondary pulley and a transfer element that is looped over the primary and secondary pulleys, and configured to provide a variable gear ratio that is lower than at least one of the at least gear ratio provided by the gear mechanism. The drive-force transmitting apparatus defines a plurality of drive-force transmitting paths that are provided in parallel with each other between the input rotary member and the output rotary member. The plurality of drive-force transmitting paths include a first drive-force transmitting path, through which the drive force is to be transmitted by the gear mechanism in a first state in which the first drive-force transmitting path is established in the drive-force transmitting apparatus. The plurality of drive-force transmitting paths include a second drive-force transmitting path, through which the drive force is to be transmitted by the continuously-variable transmission mechanism in a second state in which the second drive-force transmitting path is established in the drive-force transmitting apparatus. The control apparatus comprises a transmission shifting control portion configured to control the gear ratio of the continuously-variable transmission mechanism, and to set a target gear ratio that is a target value of the gear ratio of the continuously-variable transmission mechanism during a switching control operation that is executed to switch from one of the first and second states to the other of the first and second states, such that, when the drive wheels are not being slipped, the target gear ratio is set to a highest gear ratio that is a highest value of the gear ratio of the continuously-variable transmission mechanism, and such that, when the drive wheels are being slipped, the target gear ratio is set to an actual gear ratio that is an actual value of the gear ratio at a point of time at which the drive wheels start being slipped. The control apparatus may further comprise a state determining portion that is configured to determine whether the drive wheels are being slipped or not, wherein the transmission shifting control portion is configured, when the state determining portion determines that the drive wheels are not being slipped, to set the target gear ratio to the highest gear ratio during the switching control operation, and wherein the transmission shifting control portion is configured, when the state determining portion determines that the drive wheels are being slipped, to set the target gear ratio to the actual gear ratio during the switching control operation, wherein the actual gear ratio is an actual value of the gear ratio at the point of time at which the state determining portion starts determining that the drive wheels being slipped or at which the state determining portion determines that the drive wheels starts being slipped. Further, the continuously-variable transmission mechanism may further include a thrust applier configured to apply, to the primary pulley, a thrust based on which the transfer element is to be clamped by the primary pulley, wherein the highest gear ratio is to be established in the continuously-variable transmission mechanism by reduction of the thrust applied to the primary pulley. Still further, the drive-force transmitting apparatus may further include an engagement device which is provided in the second drive-force transmitting path and located between the continuously-variable transmission mechanism and the output rotary member in the second drive-force transmitting path, wherein the engagement device is engaged in the second state in which the second drive-force transmitting path is established in the drive-force transmitting apparatus, and is released in the first state in which the first drive-force transmitting path is established in the drive-force transmitting apparatus.

According to a second aspect of the invention, in the control apparatus according to the first aspect of the invention, the switching control operation is executed to execute a shift-down action in the drive-force transmitting apparatus for switching from the second state to the first state, wherein, when the drive wheels are being slipped, the transmission shifting control portion is configured to change the target gear ratio from the actual gear ratio to the highest gear ratio after execution of the shift-down action has been completed.

According to a third aspect of the invention, in the control apparatus according to the first or second aspect of the invention, the switching control operation is executed to execute a shift-up action in the drive-force transmitting apparatus for switching from the first state to the second state, wherein, when the drive wheels are being slipped, the transmission shifting control portion is configured to keep the target gear ratio at the actual gear ratio even after execution of the shift-up action has been completed.

According to a fourth aspect of the invention, in the control apparatus according to the third aspect of the invention, when the drive wheels are not being slipped, the transmission shifting control portion is configured to change the target gear ratio from the highest gear ratio to a value of the gear ratio that is dependent on a running speed of the vehicle, after the execution of the shift-up action has been completed.

According to a fifth aspect of the invention, in the control apparatus according to any one of the first through fourth aspects of the invention, during running of the vehicle in the first state in which the first drive-force transmitting path is established in the drive-force transmitting apparatus, the transmission shifting control portion is configured to set the target gear ratio to the highest gear ratio, irrespective of whether the drive wheels are being slipped or not.

According to a sixth aspect of the invention, in the control apparatus according to any one of the first through fifth aspects of the invention, the first drive-force transmitting path is to be established by engagement of a first engagement device that is provided in the first drive-force transmitting path, and the second drive-force transmitting path is to be established by engagement of a second engagement device that is provided in the second drive-force transmitting path, wherein the switching control operation is a stepped-shifting control operation that is executed by switching an operation state of the first engagement device and an operation state of the second engagement device.

In the control apparatus according to the first aspect of the invention, when the drive wheels are not being slipped, the target gear ratio of the continuously-variable transmission mechanism is set to the highest gear ratio during the switching control operation that is executed to switch from one of the first state (in which the first drive-force transmitting path is established) and the second state (in which the second drive-force transmitting path is established) to the other of the first and second states, so that a shift-down action of the continuously-variable transmission mechanism is executed together with execution of the switching control operation. Thus, a responsiveness of the switching control operation is improved as compared with an arrangement in which the switching control operation is started after the gear ratio of the continuously-variable transmission mechanism has become the highest gear ratio. On the other hand, when the drive wheels are being slipped, the target gear ratio of the continuously-variable transmission mechanism is set to the actual gear ratio that is the actual value of the gear ratio at the point of time at which the drive wheels start being slipped, so that the shift-down action of the continuously-variable transmission mechanism is not executed even if the gear ratio of the continuously-variable transmission mechanism is not the highest gear ratio. Thus, even if the excessively large torque, which is generated after occurrence of the slippage of the drive wheels, is inputted from the drive wheels and is transmitted to the continuously-variable transmission mechanism provided in the second drive-force transmitting path, the slippage of the transfer element due to reduction of a thrust applied to the primary pulley resulting from the shift-down action of the continuously-variable transmission mechanism does not occur or is unlikely to occur. It is therefore possible to retrain or prevent the transfer element from being slipped in case of occurrence of slippage of the drive wheels.

In the control apparatus according to the second aspect of the invention, when the drive wheels are being slipped, the target gear ratio is changed from the actual gear ratio to the highest gear ratio after execution of the shift-down action in the drive-force transmitting apparatus by which the second state (in which the second drive-force transmitting path is established in the drive-force transmitting apparatus) is switched to the first state (in which the first drive-force transmitting path is established in the drive-force transmitting apparatus). Thus, unless the gear ratio is the highest gear ratio, the shift-down action of the continuously-variable transmission mechanism is executed in the first state, namely, in a slippage-free state in which slippage of the transfer element does not occur even with reduction of the thrust applied to the primary pulley. The slippage-free state is, for example, a state in which a clamping force for clamping the transfer element to avoid the slippage of the transfer element is assured, even with reduction of the thrust applied to the primary pulley, owing to the switch from the second state to the first state in which the excessively large torque, which is generated after occurrence of the slippage of the drive wheels, is not substantially transmitted to the continuously-variable transmission mechanism provided in the second drive-force transmitting path.

In the control apparatus according to the third aspect of the invention, when the drive wheels are being slipped, the target gear ratio is kept at the actual gear ratio (that is the actual value of the gear ratio at the point of time at which the drive wheels start being slipped) even after execution of the shift-up action by which the first state (in which the first drive-force transmitting path is established in the drive-force transmitting apparatus) is switched to the second state (in which the second drive-force transmitting path is established in the drive-force transmitting apparatus), so that the shift-down action of the continuously-variable transmission mechanism is not executed as long as the drive wheels are being slipped, even after the switch from the first state to the second state has been completed. Thus, even if the excessively large torque, which is generated after occurrence of the slippage of the drive wheels, is inputted from the drive wheels and is transmitted to the continuously-variable transmission mechanism provided in the second drive-force transmitting path, the slippage of the transfer element due to reduction of the thrust applied to the primary pulley resulting from the shift-down action does not occur or is unlikely to occur.

In the control apparatus according to the fourth aspect of the invention, when the drive wheels are not being slipped, the target gear ratio is changed from the highest gear ratio to a value of the gear ratio that is dependent on the running speed of the vehicle, after the execution of the shift-up action has been completed. Thus, when the drive wheels are not being slipped after the switch from the first state to the second state has been completed, the gear ratio of the continuously-variable transmission mechanism becomes a value that is suitable for a running state of the vehicle.

In the control apparatus according to the fifth aspect of the invention, during running of the vehicle in the first state in which the first drive-force transmitting path is established in the drive-force transmitting apparatus, the transmission shifting control portion is configured to set the target gear ratio to the highest gear ratio, irrespective of whether the drive wheels are being slipped or not. Thus, when the shift-up action of the drive-force transmitting apparatus is executed to switch from the first state (in which the first drive-force transmitting path is established) to the second state (in which the second drive-force transmitting path is established), the gear ratio of the continuously-variable transmission mechanism is likely to become a value closest to a gear ratio provided in the first drive-force transmitting path. Further, even when the drive wheels are being slipped with the gear ratio of the continuously-variable transmission mechanism being not the highest gear ratio, the shift-down action of the continuously-variable transmission mechanism is executed in the slippage-free state in which the slippage of the transfer element does occur even with reduction of the thrust applied to the primary pulley as long as the first drive-force transmitting path is established in the drive-force transmitting apparatus.

In the control apparatus according to the sixth aspect of the invention, the first drive-force transmitting path is to be established by engagement of the first engagement device, and the second drive-force transmitting path is to be established by engagement of the second engagement device, wherein the switching control operation is the stepped-shifting control operation that is executed by switching the operation state of the first engagement device and the operation state of the second engagement device. When the second engagement device has a torque capacity during execution of the stepped-shifting control operation, the entirety or part of the excessively large torque, which is generated after occurrence of the slippage of the drive wheels, could be transmitted from the drive wheels to the continuously-variable transmission mechanism via the second engagement device. Thus, when the drive wheels are being slipped, the target gear ratio of the continuously-variable transmission mechanism is set to the actual gear ratio that is the actual value of the gear ratio at the point of time at which the drive wheels start being slipped. It is therefore possible to retrain or prevent the transfer element from being slipped in case of occurrence of slippage of the drive wheels.

BRIEF DESCRIPTION OF THE DRAWINGS

FIG. 2 is a flow chart illustrating a main part of a control routine executed by the control apparatus shown in FIG. 1, namely, a control routine that is executed for restraining or preventing slippage of a transfer element when drive wheels are slipped.

DETAILED DESCRIPTION OF PREFERRED EMBODIMENT

Figure 1:
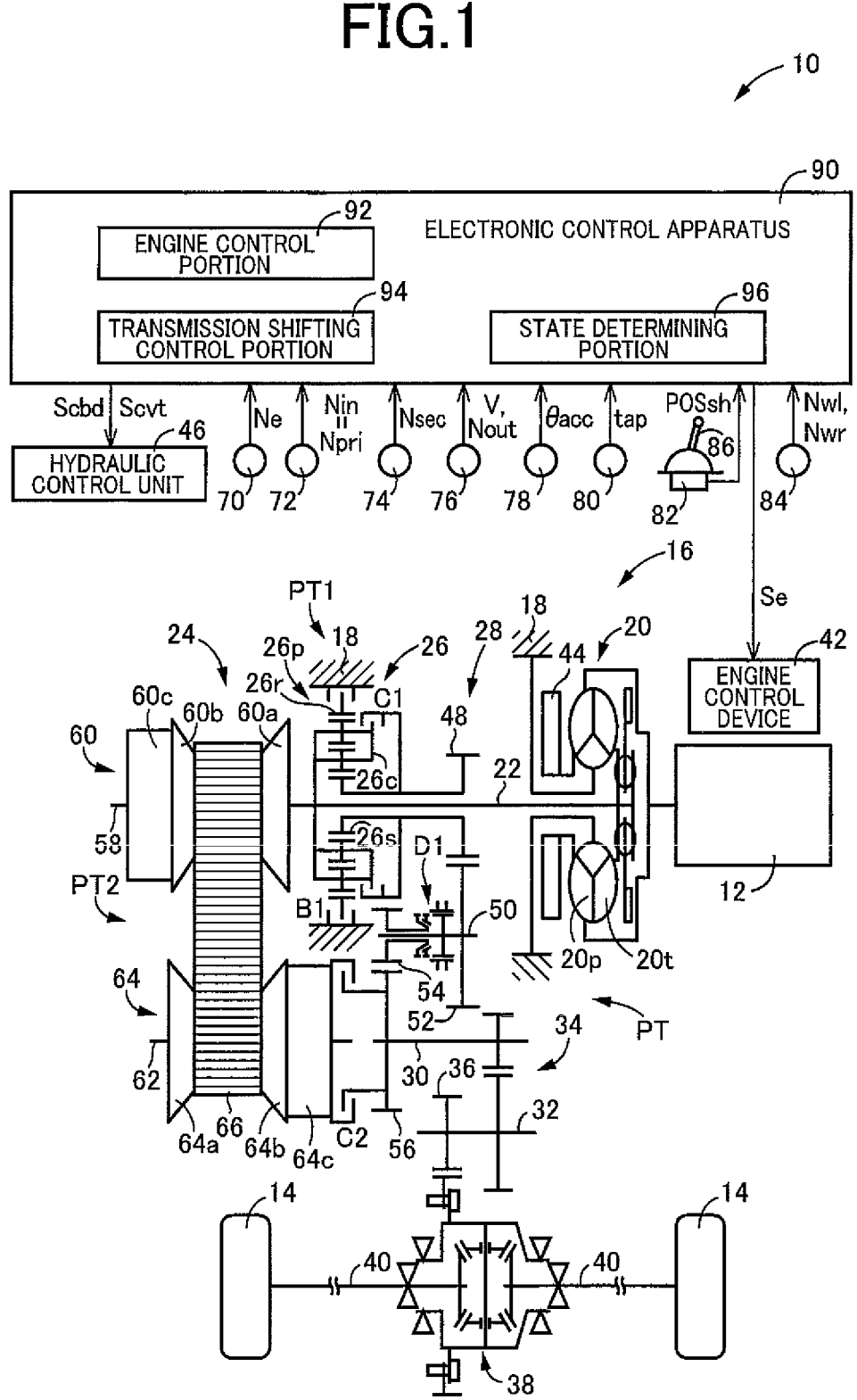
FIG. 1 is a schematic view showing a construction of a vehicle to be controlled by a control apparatus according to the present invention, and major control functions and control portions of the control apparatus.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of the transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

EMBODIMENT

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and is configured to selectively connect and disconnect the first drive-force transmitting path PT1, such that the first drive-force transmitting path PT1 is established with engagement of the first clutch C1 during forward running of the vehicle 10. The first brake B1 is provided in the first drive-force transmitting path PT1 and is configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is provided in the second drive-force transmitting path PT2 and is configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that is configured to establish the first drive-force transmitting path PT1, when being engaged together with engagement of the first clutch C1 or the first brake B1. That is, the first drive-force transmitting path PT1 is established with engagements of the dog clutch D1 and also either one of the first clutch C1 and first brake B1. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

The continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c (thrust applier) configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the hydraulic actuator 64c, to clamp the transmission belt 66 that is mounted on the secondary pulley 64. The secondary pressure Psec is a hydraulic pressure supplied from the hydraulic control unit 46 to the hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding dimeter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt (i.e., target value of the gear ratio γcvt) while the transmission belt 66 is prevented from being slipped. It is noted that the primary rotational speed Npri is a rotational speed of the primary shaft 58 and the secondary rotational speed Nsec is a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is dependent on a thrust ratio τ (=Wsec/Wpri) of the pulleys 60, 64. Namely, the gear ratio γcvt is changeable by change of the thrust ratio τ. For example, the gear ratio γcvt is increased with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, the gear ratio established in the second drive-force transmitting path PT2 is lower than the gear ratio established in the first drive-force transmitting path PT1. It is noted that the input-shaft rotational speed Nin is a rotational speed of the input shaft 22 and the output-shaft rotational speed Nout is a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26$p$ from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; an output signal of a wheel speed sensor 84 indicative of wheel speeds Nwl, Nwr of the respective left and right drive wheels 14; and an output signal of a shift position sensor 82 indicative of an operation position POSsh of a manually-operated shifting member in the form of a shift lever 86 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is a rotational speed of the turbine impeller 20$t$ of the of the torque converter 20. It is also noted that the primary rotational speed Npri is a rotational speed of the primary pulley 60 and that the secondary rotational speed Nsec is a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 86 is operable to be placed in a selected one of a plurality of operation positions POSsh that consist of, for example, a parking position P, a reverse position R, a neutral position N and a drive position D. With the shift lever 86 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. With the shift lever 86 being placed in the reverse position R, the drive-force transmitting apparatus 16 is placed in its reverse drive position for enabling the reverse running of the vehicle 10 in the gear running mode. With the shift lever 86 being placed in the neutral position N, the drive-force transmitting apparatus 16 is placed in its neutral position in which the drive-force transmitting apparatus 16 is placed in its neutral state. With the shift lever 86 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94 and a state determining means or portion in the form of a state determining portion 96.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 86 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped-shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped-shifting control operation to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established, to the belt running mode (i.e., second state) in which the second drive-force transmitting path PT2 is established. In the following description relating to the present embodiment, the shift-up action, which is executed in the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. Thus, as a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped-shifting control operation to engage and release the first and second clutches C1, C2, respectively, so as to cause the drive-force transmitting apparatus 16 to execute the shift-down action by which the selected running mode is switched from the belt running mode in which the second drive-force transmitting path PT2 is established, to the gear running mode in which the first drive-force transmitting path PT1 is established. In the following description relating to the present embodiment, the shift-down action, which is executed in the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained. The switching control operation executed for switching the running mode between the gear running mode and the belt running mode corresponds to the stepped-shifting control operation executed by switching the operation state of the first clutch C1 and the operation state of the second clutch C2. In the following descriptions relating to the present embodiment, the switching control operation for switching between the gear running mode and the belt running mode will be referred to as "clutch-to-clutch shifting control operation" or "C-to-C shifting control operation".

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Ppri and the secondary pressure Psec such that the target gear ratio γcvttgt is provided in the continuously-variable transmission mechanism 24 while the belt slippage is not caused in the continuously-variable transmission mechanism 24.

Specifically, the transmission shifting control portion 94 calculates a target primary rotational speed Nprit, by applying the accelerator operation amount θacc and the running speed V to a predetermined relationship such as a CVT shifting map. The transmission shifting control portion 94 calculates a target gear ratio γcvttgt (=Nprit/Nsec), based on the target primary rotational speed Nprit. The transmission shifting control portion 94 calculates an estimated value of the engine torque Te, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 uses the turbine torque Tt as a primary input torque Tpri that is an input torque inputted to the primary pulley 60. The primary input torque Tpri is a torque that is to act on the primary shaft 58. The transmission shifting control portion 94 calculates a thrust ratio τ for establishing a target gear ratio γcvttgt, by applying the target gear ratio γcvttgt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 94 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvttgt. The transmission shifting control portion 94 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 94 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at a constant value, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the constant value.

Each of the target primary thrust Wprit and the target secondary thrust Wsect is calculated by taking account of a required thrust that is minimally required for preventing the belt slippage in the continuously-variable transmission mechanism 24. The required thrust is a limit thrust that corresponds to a thrust shortly before occurrence of the belt slippage in the continuously-variable transmission mechanism 24.

The transmission shifting control portion 94 sets a primary limit thrust Wprilim that is the limit thrust for the primary pulley 60 and a secondary limit thrust Wseclim that is the limit thrust for the secondary pulley 64, by using equations (1) and (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24. It is noted that the sheave angle α is an angle defined between a conical surface of each of the pulleys 60, 64 and a plane perpendicular to an axis of the each of the pulleys 60, 64.

$$W\text{prilim} = (T\text{pr} * \cos \alpha)/(2 * \mu * R\text{pri}) \tag{1}$$

$$W\text{seclim} = (\gamma cvt * T\text{pri} * \cos \alpha)/(2 * \mu * R\text{sec}) \tag{2}$$

The transmission shifting control portion 94 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvttgt. The transmission shifting control portion 94 sets, as a target secondary thrust Wsect, a larger one of the secondary limit thrust Wseclim and the secondary shifting-control thrust Wsecsh. The transmission shifting control portion 94 calculates the target primary thrust Wprit (=Wsect/τ), based on the target secondary thrust Wsect and the thrust ratio τ that is required to establish the target gear ratio γcvttgt.

From point of view of controllability, it is preferable that the C-to-C shifting control operation of the drive-force transmitting apparatus 16, by which the stepped shift-up action or the stepped shift-down action is executed, is made between the gear ratio EL of the gear mechanism 28 and a predetermined value of the gear ratio γcvt of the continuously-variable transmission mechanism 24, like a stepped-shifting control operation that is made between two fixed gear ratios in a known stepped transmission. In the present embodiment, the above-described predetermined value of the gear ratio γcvt of the continuously-variable transmission mechanism 24 is set to the highest value of the gear ratio γcvt, i.e., the highest gear ratio γmax, which is the most close to the gear ratio EL of the gear mechanism 28, in order to reduce an amount of change of the primary rotational speed Npri and/or maintain a consistency of the drive force upon execution of the C-to-C shifting control operation. The reduction of the amount of change of the primary rotational speed Npri leads to, for example, reduction of amount of heat generated on the second clutch C2 upon engagement of the second clutch C2.

When the stepped shift-down action of the drive-force transmitting apparatus 16 is a power-on shift-down action that is determined to be executed as a result of increase of a required drive force (e.g., increase of the accelerator operation amount θacc), it is preferable that a higher priority is given to an acceleration responsiveness rather than to a shock reduction. Thus, when the stepped shift-down action of the drive-force transmitting apparatus 16 is the power-on shift-down action, the transmission shifting control portion 94 executes the stepped shift-down action even without the gear ratio γcvt of the continuously-variable transmission mechanism 24 being the highest gear ratio γmax. In this case, the transmission shifting control portion 94 controls the continuously-variable transmission mechanism 24 such that the gear ratio γcvt becomes the highest gear ratio γmax, together with execution of the stepped shift-down action of the drive-force transmitting apparatus 16.

When the shift-down action of the continuously-variable transmission mechanism 24 increasing the gear ratio γcvt to the highest gear ratio γmax is executed together with the execution of the stepped shift-down action of the drive-force transmitting apparatus 16, there is a case in which a power-off shift-up action as the stepped shift-up action of the drive-force transmitting apparatus 16 is determined to be executed as a result of reduction of the required drive force (e.g., reduction of the accelerator operation amount θacc). In this case in which a vehicle operator, who releases the accelerator pedal, expects that the engine rotational speed Ne is lowered, it is preferable that the power-off shift-up action is immediately initiated in the drive-force transmitting apparatus 16. Therefore, if the stepped shift-up action is determined to be executed in the drive-force transmitting apparatus 16 when the shift-down action of the continuously-variable transmission mechanism 24 is being executed together with the execution of the stepped shift-down action of the drive-force transmitting apparatus 16, the transmission shifting control portion 94 executes the stepped shift-up action in place of the stepped shift-down action, even in a state in which the gear ratio γcvt of the continuously-variable transmission mechanism 24 is not the highest gear ratio γmax. In this instance, it is preferable that a rotational speed difference of the second clutch C2 is minimized upon engagement of the second clutch C2, for restraining heat generation of the second clutch C2 that could cause reduction of the durability of the second clutch C2. Therefore, the transmission shifting control portion 94 continues the execution of the shift-down action that increases the gear ratio γcvt to the highest gear ratio γmax in the of the continuously-variable transmission mechanism 24, together with the execution of the stepped shift-up action of the drive-force transmitting apparatus 16.

As described above, it is preferable that the C-to-C shifting control operation of the dive-force transmitting apparatus 16 is executed with the gear ratio γcvt of the continuously-variable transmission mechanism 24 being the highest gear ratio γmax. During running of the vehicle 10 in the gear running mode, the transmission shifting control portion 94 sets the gear ratio γcvt of the continuously-variable transmission mechanism 24 to the highest gear ratio γmax in preparation for the stepped shift-up action of the drive-force transmitting apparatus 16. That is, during the running of the vehicle 10 in the gear running mode, the transmission shifting control portion 94 sets the target gear ratio γcvttgt of the continuously-variable transmission mechanism 24 to the highest gear ratio γ max.

The C-to-C shifting control operation of the drive-force transmitting apparatus 16 is executed even when the gear ratio γcvt of the continuously-variable transmission mechanism 24 is not the highest gear ratio γmax. In this instance, the transmission shifting control portion 94 sets to the gear ratio γcvt of the continuously-variable transmission mechanism 24 to the highest gear ratio γmax. That is, during the execution of the C-to-C shifting control operation, the transmission shifting control portion 94 sets the target gear ratio γcvttgt of the continuously-variable transmission mechanism 24 to the highest gear ratio γmax, even if the gear ratio γcvt is already the highest gear ratio γmax.

By the way, there is a case in which an excessively large torque is inputted to the drive-force transmitting apparatus 16 from the drive wheels 14, for example, upon sudden reduction of rotational speed of the drive wheels 14 when the vehicle 10 has passed through a low friction-efficient road on which a tire slippage had occurred, namely, the drive wheels 14 had been slipped, wherein the sudden reduction of the rotational speed of the drive wheels 14 is caused by grip of the drive wheels 14 with a surface of the road. Meanwhile, the shift-down action that increases the gear ratio γcvt of the continuously-variable transmission mechanism 24 to the highest gear ratio γmax is executed during execution of the C-to-C shifting control operation that has been started without the gear ratio γcvt of the continuously-variable transmission mechanism 24 being the highest gear ratio γmax. If the second clutch C2 has a torque capacity during the execution of the C-to-C shifting control operation, the excessively large torque is transmitted from the drive wheels 14 to the transmission belt 66 by a torque amount that is not larger than the torque capacity of the second clutch C2, namely, a part of the excessively large torque, which is not larger than the torque capacity of the second clutch C2, is transmitted to the transmission belt 66. In this instance, the belt torque capacity Tcvt is reduced with reduction of the primary thrust Wpri that results from the shift-down action of the continuously-variable transmission mechanism 24, so that the entirety or part of the excessively large torque transmitted from the drive wheels 14 could be higher than the reduced belt torque capacity Tcvt, thereby causing a risk that a belt slippage could occur.

When the tire slippage occurs, namely, when the drive wheels 14 are slipped, there is a possibility that the entirety or part of the excessively large torque could be inputted from the drive wheels 14 after the tire slippage. Therefore, the transmission shifting control portion 94 changes the gear ratio γcvt of the continuously-variable transmission mechanism 24 in a manner that is dependent on whether the tire slippage occurs or not. The manner of change of the gear ratio γcvt of the continuously-variable transmission mechanism 24 can be varied by varying the target gear ratio γcvttgt of the continuously-variable transmission mechanism 24.

Specifically, the state determining portion 96 determines whether the drive wheels 14 are being slipped or not, namely, whether the tire slippage is occurring or not. The state determining portion 96 makes this determination based on whether at least one of rates of changes of the wheel speeds Nwl, Nwr, which correspond to angular accelerations of the drive wheels 14, is higher than a slippage-determination threshold that is a value predetermined for the determination of the tire slippage. When having determined that the tire slippage occurs, the state determining portion 96 determines whether the tire slippage has been stopped or not, namely, the drive wheels 14 have become gripping a road surface, based on the wheel speeds Nwl, Nwr. Thus, the state determining portion 96 holds the determination that the tire slippage being occurring during a period of time from a point of time at which the determination of the tire slippage until a point of time at which the determination of the tire gripping is made.

The state determining portion 96 determines whether the C-to-C shifting control operation is being executed or not. Further, the state determining portion 96 determines whether the vehicle 10 is running in the gear running mode or not, and determines whether the vehicle 10 is running in the belt running mode or not.

When it is determined by the state determining portion 96 that the tire slippage is not occurring and that the C-to-C shifting control operation is being executed, the transmission shifting control portion 94 sets the target gear ratio γcvttgt of the continuously-variable transmission mechanism 24 during execution of the C-to-C shifting control operation, to the highest gear ratio γmax. On the other hand, when it is determined by the state determining portion 96 that the tire slippage is occurring and that the C-to-C shifting control operation is being executed, the transmission shifting control portion 94 sets the target gear ratio γcvttgt of the continuously-variable transmission mechanism 24 during execution of the C-to-C shifting control operation, to an actual gear ratio γcvt that is an actual value of the gear ratio γcvt at a point of time at which the state determining portion 96 started to determine that the tire slippage occurs. By setting the target gear ratio γcvttgt of the continuously-variable transmission mechanism 24 to the actual gear ratio γcvt at the time point of start of the tire slippage, the shift-down action of the continuously-variable transmission mechanism 24 is not executed and accordingly the belt torque capacity Tcvt is not reduced, so that the belt slippage does not occur or is unlikely to occur even if the excessively large torque is transmitted from the drive wheels 14 to the transmission belt 66.

When it is determined by the state determining portion 96 that the tire slippage is not occurring and that the vehicle 10 is running in the gear running mode, the transmission shifting control portion 94 sets the target gear ratio γcvttgt of the continuously-variable transmission mechanism 24 during running of the vehicle 10 in the gear running mode, to the highest gear ratio γmax. Further, when it is determined by the state determining portion 96 that the tire slippage is occurring and that the vehicle 10 is running in the gear running mode, the transmission shifting control portion 94 sets the target gear ratio γcvttgt of the continuously-variable transmission mechanism 24 during running of the vehicle 10 in the gear running mode, to the highest gear ratio γmax, as in the case of no tire slippage. During the running in the gear running mode, the second clutch C2 is released so that only a small part of the excessively large torque is transmitted from the drive wheels 14 to the transmission belt 66, wherein the small part does not exceed a torque value corresponding to a drag torque of the second clutch C2. Therefore, even if the primary thrust Wpri is lowered by the shift-down action of the continuously-variable transmission mechanism 24 which is executed to increase the gear ratio γcvt to the highest gear ratio γmax as the target gear ratio γcvttgt, the belt torque capacity Tcvt sufficient to avoid the belt slippage is assured. Thus, during the running in the gear running mode, the transmission shifting control portion 94 sets the target gear ratio γcvttgt of the continuously-variable transmission mechanism 24 to the highest gear ratio γmax, irrespective of whether the tire slippage is occurring or not.

When it is determined by the state determining portion 96 that the tire slippage is not occurring and that the vehicle 10 is running in the belt running mode, the transmission shifting control portion 94 sets the target gear ratio γcvttgt of the continuously-variable transmission mechanism 24 during running of the vehicle 10 in the belt running mode, to the gear ratio γcvt that is dependent on the running speed V. The gear ratio γcvt dependent on the running speed V is a value calculated in accordance with, for example, the CVT shifting map. On the other hand, when it is determined by the state determining portion 96 that the tire slippage is occurring and that the vehicle 10 is running in the belt running mode, the transmission shifting control portion 94 sets the target gear ratio γcvttgt of the continuously-variable transmission mechanism 24 during the running in the belt running mode, to the actual gear ratio γcvt at a point of time at which the state determining portion 96 started to determine that the tire slippage occurs. During the running in the belt running mode, the shift-down action and the shift-up action could be executed in the continuously-variable transmission mechanism 24. Therefore, in this case, as in the case of occurrence of the tire slippage during execution of the C-to-C shifting control operation, the target gear ratio γcvttgt of the continuously-variable transmission mechanism 24 is set to the actual gear ratio γcvt at a point of time at which the state determining portion 96 started to determine that the tire slippage occurs, so that the shift-down action is not executed in the continuously-variable transmission mechanism 24.

When the C-to-C shifting control operation in the form of the stepped shift-down action of the drive-force transmitting apparatus 16 is completed, the transition to the gear running mode is completed. When the C-to-C shifting control operation in the form of the stepped shift-up action of the drive-force transmitting apparatus 16 is completed, the transition to the belt running mode is completed. Therefore, after the execution of the C-to-C shifting control operation has been completed, the target gear ratio γcvttgt of the continuously-variable transmission mechanism 24 is set to a suitable value, dependently on which one of the gear running mode and the belt running mode is established and whether the tire slippage is occurring or not, as described above.

For example, when the tire slippage is not occurring, the transmission shifting control portion 94 sets the target gear ratio γcvttgt of the continuously-variable transmission mechanism 24 to the highest gear ratio γmax during execution of the stepped shift-down action, and keeps the target gear ratio γcvttgt at the highest gear ratio γmax even after the execution of the stepped shift-down action has been completed. On the other hand, when the tire slippage is occurring, the transmission shifting control portion 94 sets the target gear ratio γcvttgt of the continuously-variable transmission mechanism 24 to the actual gear ratio γcvt at a point of time at which the state determining portion 96 started to determine that the tire slippage occurs, during execution of the stepped shift-down action, and changes the target gear ratio γcvttgt to the highest gear ratio γmax after the execution of the stepped shift-down action has been completed. The state in which the belt slippage does not occur even with reduction of the primary thrust Wpri is, for example, a state in which the excessively large torque (that could be generated after the tire slippage) is not substantially transmitted to the continuously-variable transmission mechanism 24, due to the establishment of the gear running mode (by which the second clutch C2 is released), so that it is possible to assure the belt torque capacity Tcvt serving as the clamping force to clamp the transmission belt 66 for avoiding the belt slippage in spite of reduction of the primary thrust Wpri. Therefore, the target gear ratio γcvttgt is changed to the highest gear ratio γmax after the transition to the gear running mode has been completed.

For example, when the tire slippage is not occurring, the transmission shifting control portion 94 sets the target gear ratio γcvttgt of the continuously-variable transmission mechanism 24 to the highest gear ratio γmax during execution of the stepped shift-up action, and changes the target gear ratio γcvttgt to the gear ratio γcvt that is dependent on the running speed V after the execution of the stepped shift-up action has been completed. On the other hand, when the tire slippage is occurring, the transmission shifting control portion 94 sets the target gear ratio γcvttgt of the continuously-variable transmission mechanism 24 to the actual gear ratio γcvt at a point of time at which the state determining portion 96 started to determine that the tire slippage occurs, during execution of the stepped shift-up action, and keeps the target gear ratio γcvttgt at the actual gear ratio γcvt at the point of time at which the state determining portion 96 started to determine that the tire slippage occurs, even after the execution of the stepped shift-up action has been completed.

FIG. 2 is a flow chart illustrating a main part of a control routine executed by the control apparatus shown in FIG. 1, namely, a control routine that is executed for restraining or preventing the belt slippage when the tire slippage occurs. This control routine is executed, for example, in a repeated manner during running of the vehicle 10.

The control routine of FIG. 2 is initiated with step S10 corresponding to function of the state determining portion 96, which is implemented to determine whether the tire slippage is occurring or not. When a negative determination is made at step S10, the control flow goes to step S20 corresponding to function of the transmission shifting control portion 94, which is implemented to set the target gear ratio γcvttgt of the continuously-variable transmission mechanism 24 to a suitable value in the case of no tire slippage. For example, the target gear ratio γcvttgt is set to the highest gear ratio γmax during the gear running mode or during the C-to-C shifting control operation, and is set to the gear ratio γcvt that is dependent on the running speed V during the belt running mode. When an affirmative determination is made at step S10, step S30 corresponding to function of the state determining portion 96 is implemented to determine whether the C-to-C shifting control operation is being executed or not. When a negative determination is made at step S30, the control flow goes to step S40 corresponding to function of the state determining portion 96, which is implemented to determine whether the vehicle 10 is running in the gear running mode or not. When an affirmative determination is made at step S30, step S50 corresponding to function of the transmission shifting control portion 94 is implemented to set the target gear ratio γcvttgt of the continuously-variable transmission mechanism 24, to the actual gear ratio γcvt at the time point of start of the tire slippage. When an affirmative determination is made at step S40, step S60 corresponding to function of the transmission shifting control portion 94 is implemented to set the target gear ratio γcvttgt of the continuously-variable transmission mechanism 24, to the highest gear ratio γmax. When a negative determination is made at step S40, the control flow goes to step S70 corresponding to function of the transmission shifting control portion 94, which is implemented to set the target gear ratio γcvttgt of the continuously-variable transmission mechanism 24, to a value suitable for a state that is other than a state of execution of the C-to-C shifting control operation and a state of running in the gear running mode. For example, in a state of running in the belt running mode, the target gear ratio γcvttgt of the continuously-variable transmission mechanism 24 is set to the actual gear ratio γcvt at the time point of start of the tire slippage. After implantation of step S20, step S50, step S60 or step S70, the control flow goes to step S80 corresponding to function of the transmission shifting control portion 94, which is implemented to execute the shifting control operation, by using the target gear ratio γcvttgt that has been determined in step S20, step S50, step S60 or step S70, for example, by controlling the gear ratio γcvt to the target gear ratio γcvttgt. It is noted that, in the shifting control operation of the continuously-variable transmission mechanism 24, a target primary rotational speed Npritgt (=γcvttgt*Nsec), which is calculated based on the target gear ratio γcvttgt, also may be used.

As described above, in the present embodiment, when the tire slippage is not occurring, the target gear ratio γcvttgt of the continuously-variable transmission mechanism 24 is set to the highest gear ratio γmax during the C-to-C shifting control operation, so that the shift-down action of the continuously-variable transmission mechanism 24 is executed together with execution of the C-to-C shifting control operation. Thus, a responsiveness of the C-to-C shifting control operation is improved as compared with an arrangement in which the C-to-C shifting control operation is started after the gear ratio γcvt of the continuously-variable transmission mechanism 24 has become the highest gear ratio γmax. On the other hand, when the tire slippage is occurring, the target gear ratio γcvttgt of the continuously-variable transmission mechanism 24 is set to the actual gear ratio γcvt that is the actual value of the gear ratio γcvt at the point of time at which the tire slippage started, so that the shift-down action of the continuously-variable transmission mechanism 24 is not executed even if the gear ratio γcvt of the continuously-variable transmission mechanism 24 is not the highest gear ratio γmax. Thus, even if the excessively large torque, which is generated after occurrence of the tire slippage, is inputted from the drive wheels 14 and is transmitted to the continuously-variable transmission mechanism 24 provided in the second drive-force transmitting path PT2, the belt slippage due to reduction of the primary thrust Wpri resulting from the shift-down action of the continuously-variable transmission mechanism 24 does not occur or is unlikely to occur. It is therefore possible to retrain or prevent the transmission belt 66 from being slipped in case of occurrence of the tire slippage.

In the present embodiment, when the tire slippage is occurring, the target gear ratio γcvttgt is changed from the actual gear ratio γcvt (that is the actual value of the gear ratio γcvt at the point of time at which the tire slippage started) to the highest gear ratio γmax after execution of the stepped shift-down action of the drive-force transmitting apparatus 16. Thus, unless the gear ratio γcvt is already the highest gear ratio γmax, the shift-down action of the continuously-variable transmission mechanism 24 is executed in the first state, namely, in a slippage-free state in which the belt slippage does not occur even with reduction of the primary thrust Wpri.

In the present embodiment, when the tire slippage is occurring, the target gear ratio γcvttgt is kept at the actual gear ratio γcvt (that is the actual value of the gear ratio γcvt at the point of time at which the tire slippage started) even after execution of the stepped shift-up action of the drive-force transmitting apparatus 16, so that the shift-down action of the continuously-variable transmission mechanism 24 is not executed as long as the tire slippage is occurring, even after the switch from the first state (gear running mode) to the second state (belt running mode) has been completed. Thus, even if the excessively large torque, which is generated after occurrence of the tire slippage, is inputted from the drive wheels 14 and is transmitted to the continuously-variable transmission mechanism 24 provided in the second drive-force transmitting path PT2, the belt slippage due to reduction of the primary thrust Wpri resulting from the shift-down action of the continuously-variable transmission mechanism 24 does not occur or is unlikely to occur.

In the present embodiment, when the tire slippage is not occurring, the target gear ratio γcvttgt is changed from the highest gear ratio γmax to a value of the gear ratio γcvt that is dependent on the running speed V, after the execution of the stepped shift-up action has been completed. Thus, when the tire slippage is not occurring after the switch from the first state (gear running mode) to the second state (belt running mode) has been completed, the gear ratio γcvt of the continuously-variable transmission mechanism 24 becomes a value that is suitable for a running state of the vehicle 10.

In the present embodiment, during running of the vehicle 10 in the first state (gear running mode), the transmission shifting control portion 94 sets the target gear ratio γcvttgt to the highest gear ratio γmax, irrespective of whether the tire slippage is occurring or not. Thus, when the stepped shift-up action of the drive-force transmitting apparatus 16 is executed, the gear ratio γcvt of the continuously-variable transmission mechanism 24 is likely to become a value closest to the gear ratio provided in the first drive-force transmitting path PT1. Further, even when the tire slippage is occurring with the gear ratio γcvt of the continuously-variable transmission mechanism 24 being not the highest gear ratio γmax, the shift-down action of the continuously-variable transmission mechanism 24 is executed in a slippage-free state in which the belt slippage does not occur even with reduction of the primary thrust Wpri as long as the first drive-force transmitting path is established in the drive-force transmitting apparatus 16 to allow the vehicle 10 to run in the gear running mode.

While the preferred embodiment of this invention has been described in detail by reference to the drawings, it is to be understood that the invention may be otherwise embodied.

For example, in the above-described embodiment, when the tire slippage is not occurring, the target gear ratio γcvttgt of the continuously-variable transmission mechanism 24 is set to the highest gear ratio γmax during execution of the C-to-C shifting control operation. On the other hand, when the tire slippage is occurring the target gear ratio γcvttgt of the continuously-variable transmission mechanism 24 is set to the actual gear ratio γcvt that is the actual value of the gear ratio γcvt at the point of time at which the state determining portion 96 starts to determine that the tire slippage is occurring. The C-to-C shifting control operation is executed to, for example, execute either one of the stepped shift-down action and stepped shift-up action of the drive-force transmitting apparatus 16. However, the execution of the C-to-C shifting control operation may be interpreted to execute at least the stepped shift-down action of the transmitting apparatus 16.

In the above-described embodiment, as a factor of occurrence of the belt slippage, there has been described the excessively large torque that is inputted to the drive-force transmitting apparatus 16 from the drive wheels 14, upon sudden reduction of the rotational speed of the drive wheels 14 when the vehicle 10 has passed through a low friction-efficient road on which the tire slippage occurred. However, the factor of occurrence of the belt slippage may be an excessively large torque that could be inputted to the drive-force transmitting apparatus 16 from the drive wheels 14, upon sudden reduction of the rotational speed of the drive wheels 14 when the vehicle 10 has passed through a poor-conditioned road such as a wave-like road on which the tire slippage occurred, wherein the sudden reduction of the rotational speed of the drive wheels 14 is caused by grip of the drive wheels 14 with a surface of the road. In case of running in the poor-conditioned road such as a wave-like road, for example, the tire slippage on the road surface and the tire grip with the road surface could be alternately repeated at a short cycle time. Therefore, it is preferable that it is determined that the tire slippage is occurring as long as the tire slippage and the tire grip are alternately repeated.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Where the gear mechanism 28 provides a plurality of different gear ratios, the plurality of different gear ratios may include a gear ratio that is lower than the lowest gear ratio γmin of the continuously-variable transmission mechanism 24 in addition to another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
90: electronic control apparatus (control apparatus)
94: transmission shifting control portion
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
    wherein the drive-force transmitting apparatus includes:
    an input rotary member to which a drive force is to be transmitted from the drive force source;
    an output rotary member from which the drive force is to be outputted to the drive wheels;
    a gear mechanism configured to provide at least one gear ratio; and
    a continuously-variable transmission mechanism including a primary pulley, a secondary pulley and a transfer element that is looped over the primary and secondary pulleys, and configured to provide a variable gear ratio that is lower than at least one of the at least gear ratio provided by the gear mechanism,
    wherein the drive-force transmitting apparatus defines a plurality of drive-force transmitting paths that are provided in parallel with each other between the input rotary member and the output rotary member,
    wherein the plurality of drive-force transmitting paths include a first drive-force transmitting path, through which the drive force is to be transmitted by the gear mechanism in a first state in which the first drive-force transmitting path is established in the drive-force transmitting apparatus,
    wherein the plurality of drive-force transmitting paths include a second drive-force transmitting path, through which the drive force is to be transmitted by the continuously-variable transmission mechanism in a second state in which the second drive-force transmitting path is established in the drive-force transmitting apparatus, and
    wherein said control apparatus comprises:
    a transmission shifting control portion configured to control the gear ratio of the continuously-variable transmission mechanism, and to set a target gear ratio that is a target value of the gear ratio of the continuously-variable transmission mechanism during a switching control operation that is executed to switch from one of the first and second states to the other of the first and second states, such that, when the drive wheels are not being slipped, the target gear ratio is set to a highest gear ratio that is a highest value of the gear ratio of the continuously-variable transmission mechanism, and such that, when the drive wheels are being slipped, the target gear ratio is set to an actual gear ratio that is an actual value of the gear ratio at a point of time at which the drive wheels start being slipped.

2. The control apparatus according to claim 1,
    wherein the switching control operation is executed to execute a shift-down action in the drive-force transmitting apparatus for switching from the second state to the first state, and
    wherein, when the drive wheels are being slipped, said transmission shifting control portion is configured to change the target gear ratio from the actual gear ratio to the highest gear ratio after execution of the shift-down action has been completed.

3. The control apparatus according to claim 1,
    wherein the switching control operation is executed to execute a shift-up action in the drive-force transmitting apparatus for switching from the first state to the second state, and
    wherein, when the drive wheels are being slipped, said transmission shifting control portion is configured to keep the target gear ratio at the actual gear ratio even after execution of the shift-up action has been completed.

4. The control apparatus according to claim 3, wherein, when the drive wheels are not being slipped, said transmission shifting control portion is configured to change the target gear ratio from the highest gear ratio to a value of the gear ratio that is dependent on a running speed of the vehicle, after the execution of the shift-up action has been completed.

5. The control apparatus according to claim 1, wherein, during running of the vehicle in the first state in which the first drive-force transmitting path is established in the drive-force transmitting apparatus, said transmission shifting control portion is configured to set the target gear ratio to the highest gear ratio, irrespective of whether the drive wheels are being slipped or not.

6. The control apparatus according to claim 1,
    wherein the first drive-force transmitting path is to be established by engagement of a first engagement device that is provided in the first drive-force transmitting path, and the second drive-force transmitting path is to be established by engagement of a second engagement device that is provided in the second drive-force transmitting path, and
    wherein the switching control operation is a stepped-shifting control operation that is executed by switching an operation state of the first engagement device and an operation state of the second engagement device.

7. The control apparatus according to claim 1, further comprising a state determining portion that is configured to determine whether the drive wheels are being slipped or not,
    wherein said transmission shifting control portion is configured, when said state determining portion determines that the drive wheels are not being slipped, to set the target gear ratio to the highest gear ratio during the switching control operation, and wherein said transmission shifting control portion is configured, when said state determining portion determines that the drive wheels are being slipped, to set the target gear ratio to the actual gear ratio during the switching control operation, the actual gear ratio being the actual value of the gear ratio at the point of time at which the state determining portion starts to determine that the drive wheels start being slipped.

8. The control apparatus according to claim 1,
wherein the continuously-variable transmission mechanism further includes a thrust applier configured to apply, to the primary pulley, a thrust based on which the transfer element is to be clamped by the primary pulley, and
wherein the highest gear ratio is to be established in the continuously-variable transmission mechanism by reduction of the thrust applied to the primary pulley.

9. The control apparatus according to claim 1,
wherein the drive-force transmitting apparatus further includes an engagement device which is provided in the second drive-force transmitting path and located between the continuously-variable transmission mechanism and the output rotary member in the second drive-force transmitting path, and
wherein the engagement device is engaged in the second state in which the second drive-force transmitting path is established in the drive-force transmitting apparatus, and is released in the first state in which the first drive-force transmitting path is established in the drive-force transmitting apparatus.

* * * * *